May 23, 1933.    C. F. BINDER    1,910,788
BATTERY POST TERMINAL EXTENSION
Filed May 6, 1930
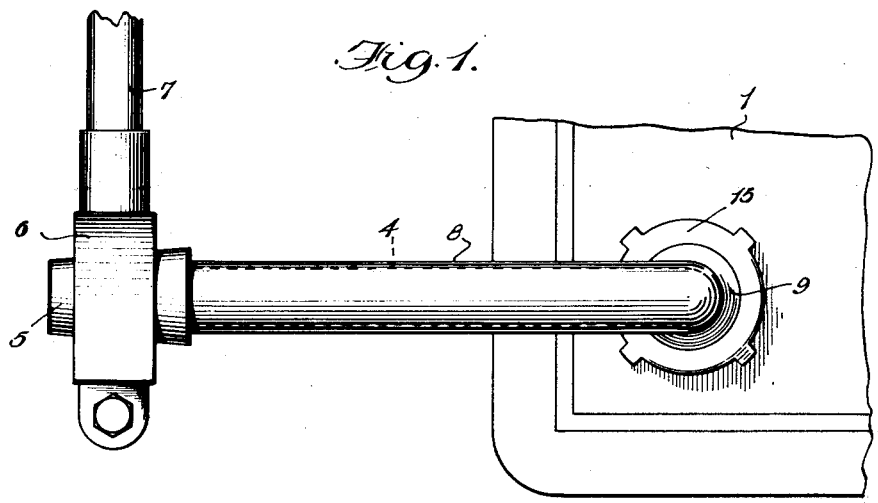
Fig. 1.
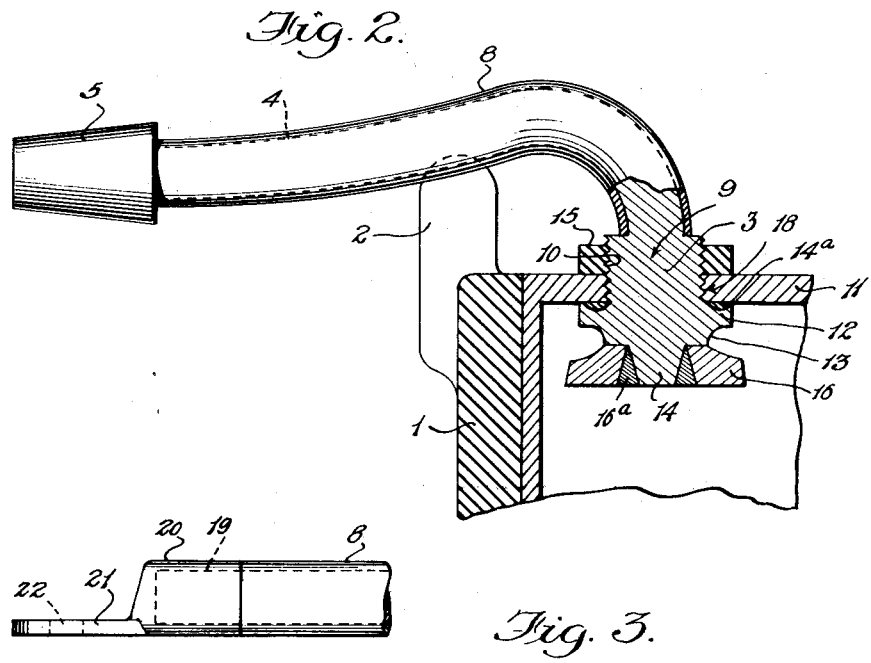
Fig. 2.
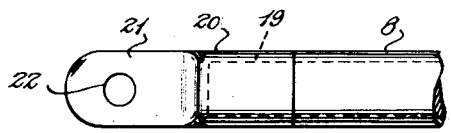
Fig. 3.
Fig. 4.
Inventor
C. F. Binder
By Lowe & Lowe
Attorneys Patented May 23, 1933

1,910,788

UNITED STATES PATENT OFFICE

CHARLES F. BINDER, OF ATLANTA, GEORGIA

BATTERY POST TERMINAL EXTENSION

Application filed May 6, 1930. Serial No. 450,260.

The present invention relates to storage batteries, such as automobile, radio and similar batteries, and has for its objects to provide an extension arm or attachment for one or both of the battery terminal posts whereby sulphate deposits and corrosion of the terminals due to acid vapors is effectually prevented.

In my co-pending application S. N. 435,175, filed March 12, 1930, now Patent No. 1,854,328, granted April 19, 1932, for Battery post extension, I have described a similar device for preventing the stated corrosion and sulphate deposits which are a common objection encountered in the use of storage batteries, particularly when used in automobiles or as a part of the equipment of radio apparatus.

In my said co-pending application referred to, the improvements consist of an extension arm or member constructed of an acid resisting and corrosive proof alloy consisting preferably of 2 parts antimony and 98 parts pure St. Joe lead. This arm is designed to be removably secured at one end of the usual battery post terminal, for example, the positive terminal, and the other end of said arm is intended and designed to be similarly secured to the usual current conducting cable. When the improvements are used in connection with automobile storage batteries this cable, to which the outer end of the arm is secured, may be the usual starter cable of the automobile, and which in the absence of the described invention would be secured directly to the battery terminal. The advantages resulting from the improvements are fully described and illustrated in my said copending application.

The present invention is related to and based on my earlier filed application referred to but describes a modified embodiment of the same basic improvement for preventing corrosion and sulphate deposits at or adjacent the battery terminal. In both my copending application and in the present modified disclosure of the invention, the same metallic alloy is used and the cable connection is spaced from the battery to more effectually insure against the objectionable deposits described. In the present embodiment of the invention, however, the arm or extension is not separately constructed but constitutes an integral part of the battery post construction. In other words, the same results are obtained by changing the structure of the battery post terminal and forming the same of the improved alloy and prolonging or extending the post to a point remote from the battery to obtain a spacing of the cable connection from the battery as in my former identified application.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there is shown in the accompanying drawing means for carrying the same into practical effect, without limiting the improvements, in their useful applications, to the particular constructions which, for the purpose of explanation, have been made the subject of illustration. In the said drawing:—

Fig. 1 is a plan view of the improved battery post terminal extension illustrated as connected to the current conducting cable.

Fig. 2 is a side view of the same partly in vertical section, the cable connection being omitted.

Fig. 3 is a detail view in side elevation showing a modified form of cable connection.

Fig. 4 is a plan view of the same.

Referring to the drawing, the storage or other battery is indicated at 1 and may be provided with the usual handles 2, one located at each end of the battery. The battery post terminal constituting the subject of the present improvements is shown generally at 3 and is formed of an acid resisting and corrosive proof alloy of lead and antimony. A preferred and practically proved alloy for this purpose consists of two percent antimony and 98 percent St. Joe pure chemical lead. The stated proportions are illustrative of a preferred embodiment of the invention, but it will be understood that these metals may be combined in other proportions without departing from the nature and scope of the improvements.

The battery post terminal extension 3, and which may constitute the positive battery post, is prolonged or extended as illustrated at 4 and terminates in an enlarged preferably integral terminal member 5 which is preferably tapered for snug engagement with the attaching portion or clamp 6 secured to the end of the battery or other cable 7. The nature of the alloy of which the terminal extension 3 is constructed renders the same flexible and ductile so that the same may be conveniently manipulated for attaching the portion 5 to the cable clamp. The intermediate portion 4 of the terminal is preferably encased within a suitable insulating sleeve of rubber or other non-conducting material. This insures against accidental short circuiting of the battery terminal.

As best seen in Fig. 2, the battery post terminal or arm is enlarged at 9 adjacent its inner end, said enlarged portion being provided with external screw threads 10 at a point where the terminal projects through the top 11 of the battery, the latter being formed of the usual rubber composition material. Below the threaded portion the arm is widened as shown at 12 to provide an enlarged head 12 terminating in a shoulder 13 and tapered terminus 14. A rubber or other gasket 14ª is disposed above the enlarged portion 12 of the arm and between the latter and the top of the battery, and a lock nut 15 has threaded engagement with the portion 9 of the form to securely clamp the same in rigid engagement with the top of the battery. The lock nut 15 is of hard lead alloy containing substantially 7% antimony to insure against distortion or damage to the nut when the arm is being clamped in engagement with the battery. The usual battery hanger plate is indicated at 16 and is also constructed of hard lead alloy containing substantially 7% antimony. The hanger plate is rigidly and semi-permanently secured to the end of the battery arm by a burnt or welded joint designated at 16ª. The battery plates (not shown) are secured to and depend from the hanger plate 16, as is usual in battery assembly. By constructing the hanger plate 16 of hard alloy the attached battery plates are held more rigidly and are more effectually prevented from sagging or swaying.

It is to be understood that the described improvements are intended to constitute in effect a permanent part of the battery and are installed when the battery is constructed. In securing the arm in place, the same with the hanger plate fused in place thereon, is projected or threaded upwardly through the aperture 18 in the top wall 11 of the battery, with the rubber gasket 14 in position against the enlarged flange 12 of the arm. The lock nut 15 is loosely slipped over the terminal portion 5 of the arm and threaded downwardly on the portion 9 to securely clamp the latter in position. The integral structure of the arm permits unobstructed passage of the electric current without permitting objectionable corrosion or sulphate deposits. The prolongation 4 of the arm spaces the cable engaging terminal portion 5 a sufficient distance from the battery to insure against corrosion or sulphate deposits at this latter point. The acid resisting alloy construction of the terminal portion 5 further insures against corrosion and deposits at this point. These objectionable deposits result from acid vapors emanating from the battery and it will be obvious that this described spacing of the cable connection from the battery by means of an acid resisting and corrosive proof terminal effectually guards against impairment of the cable connection due to these described objectionable deposits.

In Figs. 3 and 4 a modified form of cable connection is illustrated. Instead of an enlarged tapered terminal illustrated at 5 in Figs. 1 and 2, the end of the alloy arm terminates in a cylindrical portion 19 projecting for a distance beyond the insulating covering 8. The tubular clip 20 having a flattened portion 21 is slipped over the terminal portion 19 of the arm and is secured in place thereon as by welding or fusing or in any desired manner. A similar clip on the end of the cable 7 may be removably secured to the clip 20 by means of a bolt or screw extending through aligned apertures 22 in the flattened portions 21 of the respective clips. If desired these clips 20 may be constructed of acid-proof alloy of lead and antimony in desired or preferred proportions.

I claim:

A storage battery terminal comprising an elongated cylindrical deformable arm constructed of corrosion resisting alloy and adapted to be secured to the battery, said arm having a covering of insulating material and a tapered enlargement at its outer end for snug engagement with an electric conductor of corrodible material, the inner end of said arm having a threaded portion extending through the battery wall and a shoulder engaging the interior face of said wall, and a lock nut engaging said threaded portion exteriorly of the wall to securely clamp the arm to the battery, whereby said conductor is electrically connected to said arm at a point remote from the corrosive acid fumes emanating from said battery, the deformability of said arm adapting it for attachment to said conductor at various locations relative to the battery.

In testimony whereof I affix my signature.

CHARLES F. BINDER.